United States Patent [19]
Spiegel et al.

[11] Patent Number: 5,649,108
[45] Date of Patent: Jul. 15, 1997

[54] COMBINED PROGRESSIVE AND SOURCE ROUTING CONTROL FOR CONNECTION-ORIENTED COMMUNICATIONS NETWORKS

[75] Inventors: Ethan Spiegel; Tutomu Murase, both of Tokyo, Japan

[73] Assignee: NEC Corporation, Tokyo, Japan

[21] Appl. No.: 351,073

[22] Filed: Nov. 30, 1994

[30] Foreign Application Priority Data

Nov. 30, 1993 [JP] Japan ..................... 5-300252

[51] Int. Cl.$^6$ ............................................. G06F 13/14
[52] U.S. Cl. ..................... 395/200.12; 395/200.08; 370/400; 364/284; 364/DIG. 1
[58] Field of Search .............. 395/200.08, 200.12, 395/200.01; 370/54, 94.1; 364/284, DIG. 1

[56] References Cited

U.S. PATENT DOCUMENTS

| 4,656,658 | 4/1987 | King | 379/221 |
|---|---|---|---|
| 4,931,941 | 6/1990 | Krishnan | 364/437 |
| 5,452,294 | 9/1995 | Natarajan | 370/54 |

OTHER PUBLICATIONS

R. Coltun et al., "VC Routing Protocol Proposal," IETF Internet Draf, pp. 1–18 Mar. 1993.
CC/TT Recommendation 1.371, *Traffic Control and Congestion control in B–ISDN*, Study Group 13, Geneva, Mar. 1994, pp. 1–33, pp. 1–24.

Primary Examiner—Alyssa H. Bowler
Assistant Examiner—John Harrity
Attorney, Agent, or Firm—Foley & Lardner

[57] ABSTRACT

In a connection-oriented communications network, a source node selects one of first and second routing mode flags and a first route to a destination node in response to a connection request, and establishes a connection to a first intermediate node located along the first route. The first intermediate node is responsive to the first flag for extending the connection along the first route if there is an acceptable link in the first route. If there is no acceptable link, it finds a first route section therefrom to the destination node and extends the connection along the first route section if a total cost of links from the source node to the destination node using the first route section is less than a cost threshold, or cranks the connection back to an upstream node if there is none of such route sections. The upstream node then finds a second route section if a total cost of links from the source node to the destination node using the second route section is less than the cost threshold and extends the connection from the upstream node to a second intermediate node along the second route section, or clears the connection if there is none of the such route sections. On clearing the connection, the source node may or may not select the other flag. In either case, it selects a second, alternate route to the destination node and establishes a connection to a third intermediate node along the second route. If the flag is set to the first mode, the third intermediate node operates in the same manner as the first intermediate node does, and if the flag is set to the second mode, it extends the connection along the second route if there is an acceptable link. Otherwise, it clears the connection if there is no acceptable link and communicates this fact to the source node.

10 Claims, 6 Drawing Sheets

FIG. 6A

Routing Table at Node A

| Destination Address | Source Route | Total Cumulative Cost |
|---|---|---|
| Node B | A – B | 1 |
|  | A – C – B | 6 |
| ⋮ | ⋮ | ⋮ |
| Node G | A – B – D – E – G | 5 |
|  | A – C – G | 6 |

FIG. 6B

Routing Table at Node B

| Destination Address | Source Route | Total Cumulative Cost |
|---|---|---|
| Node A | B – A | 1 |
|  | B – C – A | 6 |
| ⋮ | ⋮ | ⋮ |
| Node G | B – D – E – G | 4 |
|  | B – C – G | 8 |

FIG. 6C

Routing Table at Node C

| Destination Address | Source Route | Total Cumulative Cost |
|---|---|---|
| Node A | C – A | 2 |
|  | C – B – A | 5 |
| ⋮ | ⋮ | ⋮ |
| Node G | C – G | 4 |
|  | C – A – B – D – E – G | 7 |

FIG. 6D

Routing Table at Node D

| Destination Address | Source Route | Total Cumulative Cost |
|---|---|---|
| Node A | D – B – A | 2 |
|  | D – B – C – A | 7 |
| ⋮ | ⋮ | ⋮ |
| Node G | D – E – G | 3 |
|  | D – F – G | 7 |

FIG. 6E

Routing Table at Node A

| Destination Address | Source Route | Total Cumulative Cost |
|---|---|---|
| Node B | A – B | 1 |
| | A – C – B | 3 |
| | A – C – G – E – D – B | 10 |
| ⋮ | ⋮ | ⋮ |
| Node G | A – B – D – E – G | 5 |
| | A – B – F – G | 6 |
| | A – C – G | 6 |

FIG. 6F

Routing Table at Node B

| Destination Address | Source Route | Total Cumulative Cost |
|---|---|---|
| Node A | B – A | 1 |
| | B – C – A | 3 |
| | B – D – E – G – C – A | 10 |
| ⋮ | ⋮ | ⋮ |
| Node G | B – D – E – G | 4 |
| | B – F – G | 5 |
| | B – C – G | 5 |

FIG. 6G

Routing Table at Node D

| Destination Address | Source Route | Total Cumulative Cost |
|---|---|---|
| Node A | D – B – A | 2 |
| | D – B – C – A | 4 |
| | D – E – G – C – A | 9 |
| ⋮ | ⋮ | ⋮ |
| Node G | D – E – G | 3 |
| | D – B – F – G | 6 |
| | D – B – C – G | 6 |

COMBINED PROGRESSIVE AND SOURCE ROUTING CONTROL FOR CONNECTION-ORIENTED COMMUNICATIONS NETWORKS

BACKGROUND OF THE INVENTION

1. Field of the Invention

The present invention relates generally to network routing, and more specifically to multipath muting control for connection-oriented networks such as asynchronous transfer mode (ATM) networks using progressive or originating control protocols.

2. Description of the Related Art

According to prior art routing protocols, as discussed in a paper "VC Routing Proposal", IETF Internet Draft, March 1993, R. Coltun and M. Sosa, when a virtual connection is established between a source and a destination node through an ATM network, the source node determines the entire path to the destination node and sends out an out-of-band signaling packet to an intermediate node, containing a full description of this path, including all node identifiers and possibly output port identifiers. The intermediate node forwards the packet by finding an output port identifier that corresponds to their node identifier, as well as the next node identifier, from the source route included in the signaling packet. Connection setup packets are transmitted from the source node through a pre-established virtual connection used for all signaling packets through a particular output port. Each connection setup packet contains a record route, i.e., a list of the node IDs of all nodes in the virtual connection through which the last connection setup packet has been traversed. When progressive routing is allowed, the route record is used to detect and avoid looping conditions, i.e., the conditions in which a call encounters the same node two or more times in a route path. The routing protocol for connection setup packets is based on a link-state protocol. Specifically, every source node and every intermediate node capable of rerouting obtain a map of the network topology, including the presence of all links, together with a link cost that indicates the desirability of using that link. Paths are compared to each other and determined according to their total costs, equal to the sum of the link costs for all of the links comprising a path. The link costs are updated dynamically with new link costs being broadcasted to all source nodes and all intermediate nodes capable of rerouting from time to time. All source nodes and all intermediate nodes capable of rerouting use their maps of the network topology to compute routing tables, which list one or more source routes for every possible destination address. The routing tables are used to choose source routes for connection setup packets, based on the destination address and QOS (quality of service) classes. The routing tables are updated when necessary after receiving new link cost updates.

According to the CCITT Recommendation I. 371 for the ATM standards, in-band cells are forwarded along the connection after a virtual connection has been set up by using virtual connection identifiers (VCIs) in the cell headers and forwarding tables at each node. At each node, the forwarding table includes a complete list of VCs crossing that node, including the input port ID and VCI for each connection, as well as the corresponding output port ID and VCI for the same connection. When an in-band cell arrives at a certain input port with a certain VCI, the forwarding table can be used to find the corresponding output port and VCI. After changing the VCI in the cell header to the new value, the cell is forwarded to the output port and thus forwarded toward the next node for that connection. After a virtual connection has been established, each intermediate node along the connection should include corresponding entries in its forwarding table. In order to support quality-of-service classes, each node much check to see if required resources are available for a link to the next hop. If the required resources are not available, then the connection is blocked at this link. In this case, either a new path should be chosen or the connection setup process fails and no connection is established.

Prior art multipath routing protocols are broadly classified into two categories: progressive routing protocols and originating routing protocols. The progressive routing control allows intermediate nodes to reroute the connection when it is blocked while with the originating, control rerouting decision is only made at the source node. The primary advantage of progressive routing is the ability to provide fast connection setup, particularly when the propagation delay across the network an be large. The disadvantage of progressive routing include the use of suboptimal alternate paths after connection is blocked and the possibility of looping and crankback, which require complicated signaling and processing in order to detect and avoid setting up paths with loops. The primary advantage of originating control is the ability to provide the best alternate paths, or the paths with the least total cost if link-state protocols are used. The disadvantage of originating control is the possibility of long connection setup times when propagation delay is significant.

SUMMARY OF THE INVENTION

It is therefore an object of the present invention to provide routing control which combines the benefits of progressive protocols and originating routing protocols.

According to a broader aspect, the present invention provides a method for establishing a connection through a network of nodes interconnected by links. The method comprises the steps of:

a) selecting, at a source node, a route therefrom to a destination node and establishing a connection from the source node to an intermediate node on the route;

b) extending the connection from the intermediate node along the route if there is an acceptable link from the intermediate node in the selected route;

c) selecting, at the intermediate node, a route section including one or more intermediate nodes therefrom to the destination node if there is no acceptable link in the route selected by the step (a);

d) determining, at the intermediate node, whether a total cost of links from the source node to the destination node via the route section is more or less than a cost threshold and extending the connection from the intermediate node along the route section if the total cost is less than the cost threshold and there is an acceptable link in the route section; and e) clearing the connection if the total cost is more than the cost threshold or there is no acceptable link in the route section and repeating the steps (a) to (d).

According to a first specific aspect, the present invention provides a method comprising the steps of:

a) selecting, at a source node, a route therefrom to a destination node and establishing a connection from the source node to an intermediate node on the route;

b) extending the connection from the intermediate node along the route if there is an acceptable link from the intermediate node in the selected route;

c) selecting, at the intermediate node, a first route section including one or more intermediate nodes therefrom to the destination node if there is no acceptable link in the route selected by the step (a);

d) determining, at the intermediate node, whether a total cost of links from the source node to the destination node via the first route section is more or less than a cost threshold and extending the connection from the intermediate node along the first route section if the total cost is less than the cost threshold and there is an acceptable link in the route section;

e) cranking the connection from the intermediate node back to an adjacent upstream node if the total cost is more than the cost threshold and there is no acceptable link in the first route section;

f) selecting, at the upstream node, a second route section including one of more intermediate nodes therefrom to the destination node and determining whether a total cost of links from the source node to the destination node via the second route section is more or less than the cost threshold;

g) extending the connection from the upstream node along the second route section if the total cost of the step (f) is less than the cost threshold and there is an acceptable link in the second route section; and h) clearing the connection if the total cost of the step (f) is more than the cost threshold or there is no acceptable link in the second route section and repeating the steps (a) to (g).

According to a second specific aspect, the present invention provides a method which comprises the steps of:

a) selecting, at a source node, one of first and second flags respectively representing different routing modes and a first route from the source node to a destination node in response to a connection request, and establishing a connection from the source node to a first intermediate node located along the first route;

b) responsive to the first flag, extending the connection from the first intermediate node along the first route if there is an acceptable link in the first route for the first intermediate node to use, selecting a route section from the first intermediate node to the destination node if there is no acceptable link in the first route and extending the connection from the first intermediate node along the route section if a total cost of links from the source node to the destination node using the route section is less than a cost threshold, and clearing the connection if the total cost is more than the cost threshold;

c) selecting the other flag at the source node and a second route from the source node to the destination node, and establishing a connection from the source node to a second intermediate node along the second route; and d) responsive to the second flag, extending the connection from the second intermediate node along the second route if there is an acceptable link from the second intermediate node toward the destination node, and clearing the connection if there is no acceptable link therefrom toward the destination node.

According to a third specific aspect, the present invention provides a method which comprises the steps of:

a) selecting, at a source node, one of first and second flags respectively representing different routing modes and a first route from the source node to a destination node in response to a connection request, and establishing a connection from the source node to a first intermediate node located along the first route;

b) responsive to the first flag, extending the connection from the first intermediate node along the first route if there is an acceptable link in the first route for the first intermediate node to use, selecting a first route section from the first intermediate node to the destination node if there is no acceptable link in the first route and extending the connection from the first intermediate node along the first route section if a total cost of links from the source node to the destination node using the first route section is less than a cost threshold, and cranking the connection back to an upstream node if there is none of the first route sections;

c) selecting, at the upstream node, a second route section if a total cost of links from the source node to the destination node using the second route section is less than the cost threshold and extending the connection from the upstream node to a second intermediate node along the second route section, and clearing the connection if there is none of the second route sections;

c) selecting the other flag at the source node and a second route from the source node to the destination node, and establishing a connection from the source node to a third intermediate node along the second route; and d) responsive to the second flag, extending the connection from the third intermediate node along the second route if there is an acceptable link from the third intermediate node toward the destination node, and clearing the connection if there is no acceptable link therefrom toward the destination node.

According to a further aspect of the present invention, there is provided a connection-oriented communications network having a plurality of network nodes interconnected by links, each of the nodes functioning as a source node or an intermediate node and including a routing table mapping a plurality of routes from the node to other network nodes. The source node makes a search through its routing table to select a first candidate route to a destination in response to receipt of a request for a connection or a second route to the destination in response to a negative acknowledgment (NACK) packet from an adjacent node, sets a list of node identities of the selected route, a cost threshold and a cost of the link from the source node to an intermediate node of the route into a packet, and transmits the packet from the source node to the intermediate node as a connection setup packet. The intermediate node, on receiving a connection setup packet from an adjacent upstream node, adds a cost of the link from the intermediate node to an adjacent intermediate node which is identified by the list of the received packet to the cost set in the received packet if the link between the intermediate node to the adjacent intermediate node has enough resources to support a required value, and transmits the packet to the adjacent intermediate node as a new connection setup packet, searching the routing table of the intermediate node and selects a route section from the intermediate node to the node of destination not included in the list of node identities of the received packet if the route indicated by the list of the received packet has not enough resources for the link between the intermediate node and the adjacent intermediate node, wherein the selected route section has enough resources to support the required value for the link between the intermediate node and an adjacent intermediate node of the route section and a total of the cost set in the received packet and the cost of the route section is less than the cost threshold set in the received packet. In addition, the intermediate node replaces one or more node identities of the list of the received packet with one or more node identities of the route section, adds a cost of the link between the intermediate node and the adjacent intermediate node of the route section to the cost set in the received packet, and transmits the packet to the adjacent intermediate node of the route section as a new connection setup packet. The intermediate node returns a NACK packet to the adjacent upstream node if there is no acceptable route in the routing table of the intermediate node to reach the destination node and relays a NACK packet when it is received from an adjacent downstream node to the adjacent upstream node.

BRIEF DESCRIPTION OF THE DRAWINGS

The present invention will be described in further detail with reference to the accompanying drawings, in which;

FIGS. 6A to 6C show details of the routing tables of several nodes of the ATM network.

DETAILED DESCRIPTION

Figure 1:
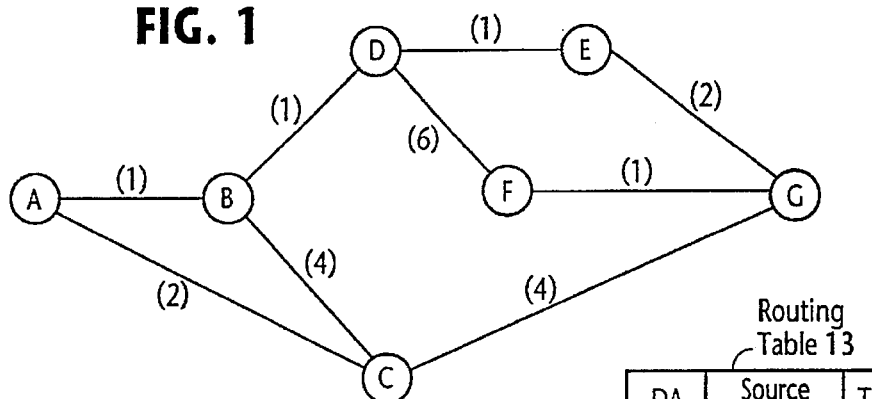
FIG. 1 shows in block diagram form a simplified ATM network in which the present invention is embodied.
Figure 2:
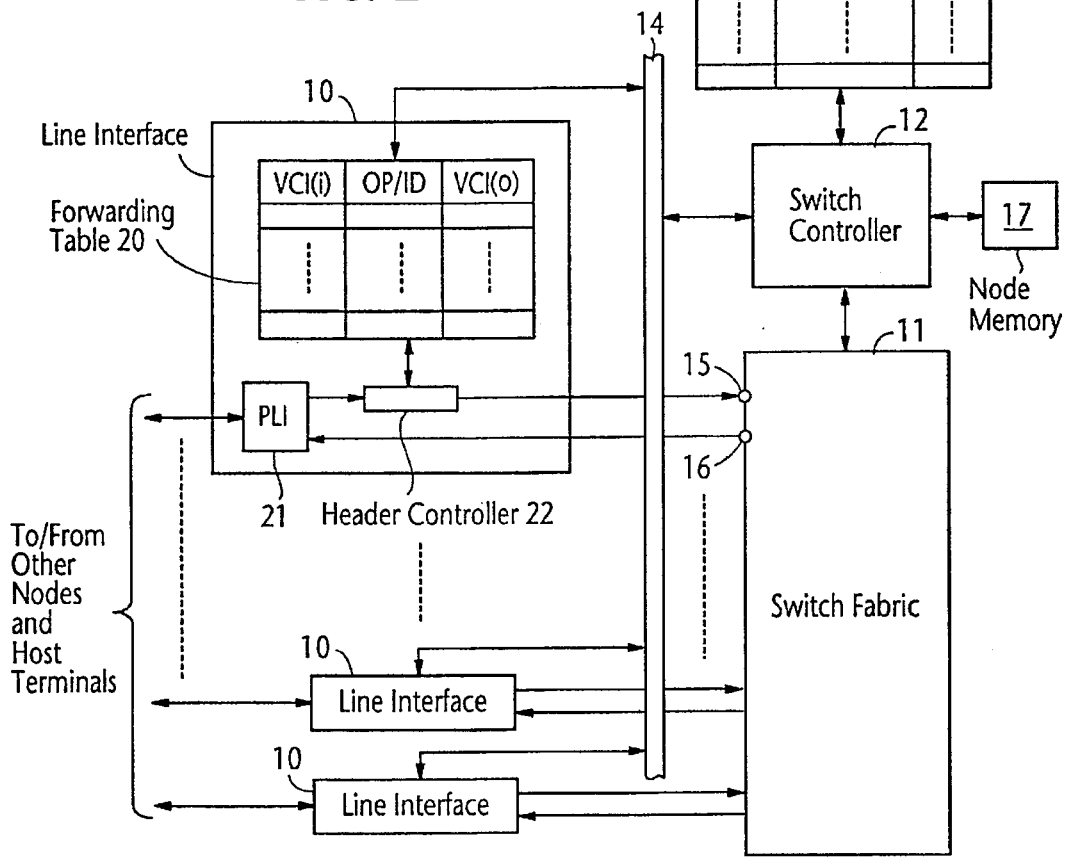
FIG. 2 shows in block diagram form a network node of the ATM network.

Referring now to FIG. 1, there is shown a simplified ATM (asynchronous transfer mode) network in which the present invention is embodied. The network is comprised by a plurality of nodes, designated A to G, interconnected by transmission lines each being marked with a number in parentheses indicating a normalized link cost. As illustrated in FIG. 2, each network node includes a plurality of line (node or host) interfaces 10 to which other network nodes and host terminals are connected. An ATM switch fabric 11 is controlled by a switch controller 12 to establish connections between line interfaces 10. Switch fabric 11 connects to each line interface 10 by an input port 15 for supporting incoming traffic from the interface and by an output port 16 for supporting outgoing traffic to the interface. The switch controller is also connected via the switch fabric to all the line interfaces 10 to receive packets therefrom. Each node further includes a node memory 17 for storing costs of links extending from the node to adjacent nodes and their node identifiers. A routing table 13 is provided which consists of entries each listing a destination address, a source route containing nodes along a source-to-destination route and a total cumulative cost of the source route. During connection establishment phase switch controller 12 looks up routing table 12 to search for a candidate route and node memory 17 for link cost calculations to adjacent nodes and for saving input and output port identifiers as required.

Figure 3:
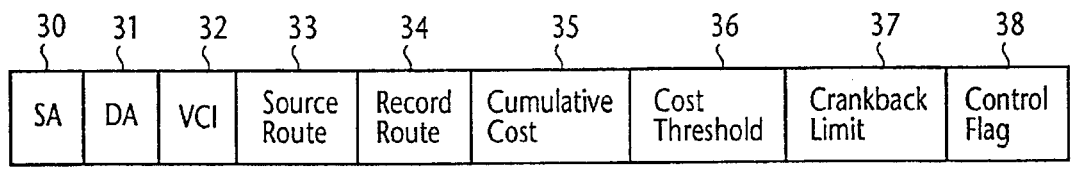
FIG. 3 shows essential fields of a connection setup packet used in the present invention.

Each node prepares a connection setup packet in response to receipt of a request from a host terminal or an adjacent node. As illustrated in FIG. 3, the connection setup packet contains a plurality of fields 30 through 38 for respectively setting a source address, a destination address, a VCI, a source route (which is a list of those nodes that the connection setup packet should pass through to establish a connection) and a record route (which is a list of those nodes through which the connection has already been established). According to this invention, the connection setup packet includes additional fields 35 through 38 for respectively setting a cumulative cost, a cost threshold, a crankback limit and a combined/originating control flag.

At each intermediate node connection setup packets are received via incoming node interfaces and through the switch fabric to switch controller 12 where the packets are updated and their contents are examined for deciding which output port to choose for a connection to be established in accordance with the routing algorithm which will be described in detail later. Each line interface 10 includes a forwarding table 20 which is accessed by the switch controller via a control bus 14 during connection establishment phase. The forwarding table at each line interface consists of entries each mapping an incoming VCI to an output port identifier and an outgoing VCI. The transmission line terminating at each line interface is connected to a physical line interface 21 which provides physical layer functions between the line and the switch fabric.

Once an output port has been chosen for a connection setup packet received through an incoming line interface, the switch controller updates the forwarding table of that line interface, so that cells can subsequently be routed through the switch fabric to the outgoing line interface of the chosen output port and transported across the network to the destination. For this purpose, a header controller 22 is connected between the physical line interface 21 and the input port 15. Whenever a data cell is received, the header controller 22 uses the VCI in the cell header to locate a corresponding entry in the forwarding table, reads an output port and a new outgoing VCI from the entry and replaces the VCI in the cell header with the new outgoing VCI so that the next node can identify the connection.

Figure 4:
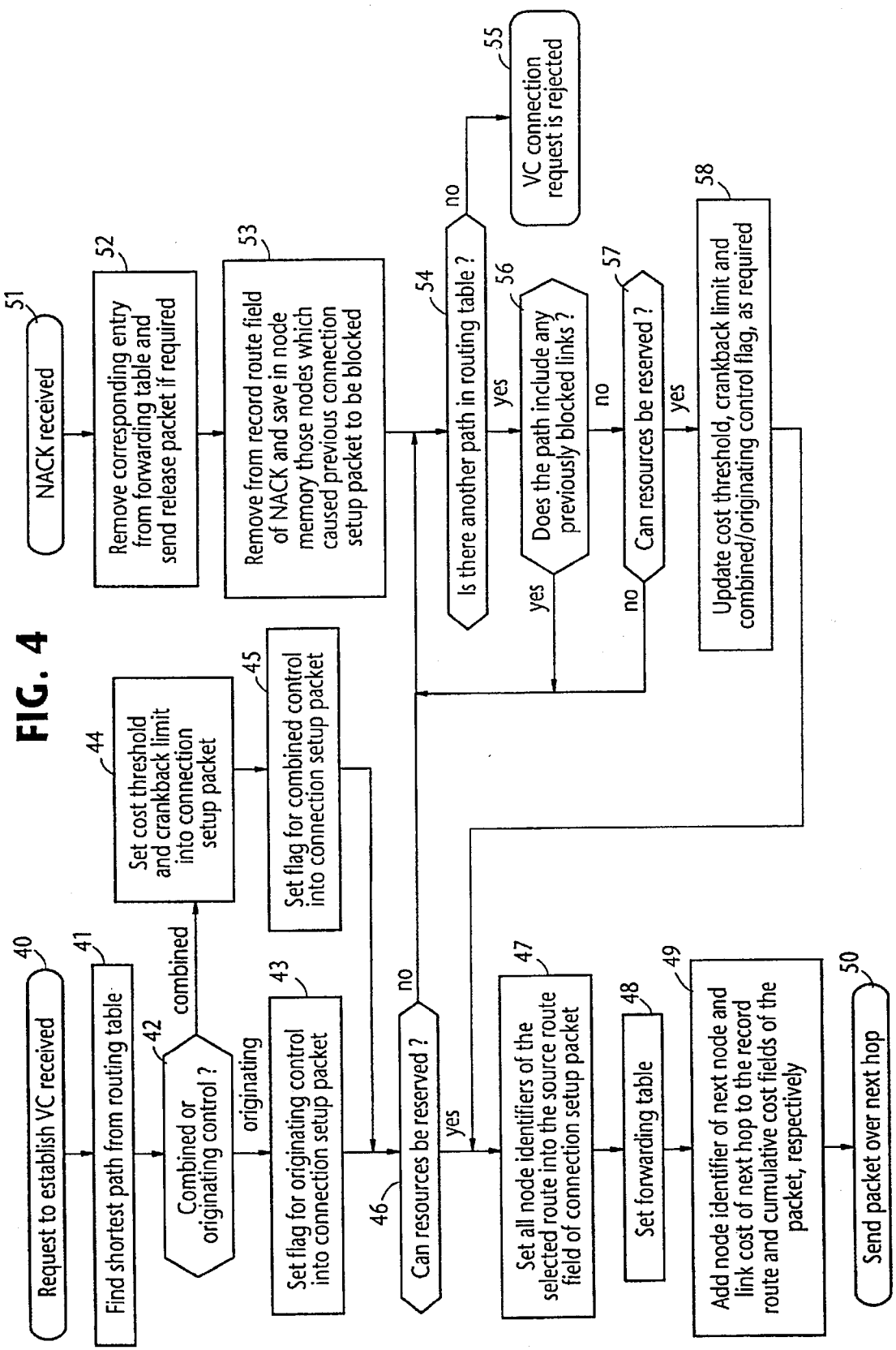
FIG. 4 shows in flow diagram form a sequence of operations performed by the switch controller of FIG. 2 when the node is functioning as a source node.

When functioning as a source node, the switch controller of each node operates in accordance with the flowchart of FIG. 4. Note that the terms "route" and "path" are equally used throughout the specification for the same connection between a source node and a destination node and the term "link" is used to identify a transmission line between adjacent nodes. The operation for establishing a virtual circuit (or connection) begins in response to receipt of a request packet from one of the line interfaces 10 (step 40). The request packet includes a VCI, a destination address (the address of the host terminal with which the source host terminal desires to communicate) and quality-of-service (QOS) parameters which will be used by successive nodes along the route to the destination. Control proceeds to step 41 to search the routing table for an entry with the shortest path, i.e., a path having the least total cumulative cost. Exit then is to decision step 42 to determine which to use the originating or combined (originating and progressive) routing control depending on the QOS parameter of the connection request packet. If the QOS parameters indicate that fast connection establishment is important, the combined routing control is selected and if the parameters indicate that a connection is to be established quickly the originating routing control is selected. If the originating routing control is selected, the control flag is set in the flag field 38 of a connection setup packet at step 43. If combined routing control is selected, control branches at step 42 to step 44 to set a cost threshold and a crankback limit into the corresponding fields 36 and 37 of a connection setup packet and the control flag is set in the flag field 38 of that packet (step 45).

After executing step 43 or 45, control proceeds to derision step 46 to provide call admission control on the request by checking to see if enough resources are available over the next hop to satisfy the QOS requirements. If the answer is affirmative, control branches at step 46 to step 47 where the switch controller accesses an entry of the routing table corresponding to the route selected at step 41 and reads the source route of the entry and sets the node identifiers contained therein into the source route field 33 of the connection setup packet. If enough resources are not available, control proceeds to step 54 which will be described later.

Exit then is to step 48 where the switch controller 12 at source node reads the connection request and stores the input VCI of the request and determines an output port ID and an outgoing VCI to be used for the next hop in a well known manner and sets them into one entry of the forwarding table 20 of the incoming line interface 10.

At step 49, the switch controller inserts the node identifier of the next node into the record route field 34 of a packet regardless of which routing control is selected at step 41, and accesses the node memory 17 to read the cost of the link to the next node if the combined control is selected at step 42 and insert the link cost to the cumulative cost field 35 of the packet. At step 50, the switch controller forwards the packet to the next node through the output port which is determined at step 48.

If the connection is blocked as the connection setup packet propagates through the network, switch controller 12 at the source node will receive a negative acknowledgment (NACK) containing the record route field of the blocked packet from an adjacent downstream node. In response, controller 12 removes the corresponding entry from the forwarding table of the incoming line interface 10 and sends a release packet, if required, over the output port and containing the outgoing VCI of the failed connection over the next hop at step 52, so that the successive nodes can use the chain of port IDs and VCIs to forward the release packet to switches with corresponding forwarding table entries, while properly removing the entries.

Following the transmission of a release packet, controller 12 enters step 53 to examine the received NACK packet to determine which links caused the previous connection setup packet to be blocked and removes the node identities associated with these links from the record route field of the NACK packet and saves them into the node memory 17 so that subsequent connection setup packets for the same connection can avoid these links in order not to be blocked at the same places.

Control proceeds to decision step 54 to check to see if there is another path in the routing table 13. If no further alternative paths are listed in the routing table, then this connection cannot be established and so the connection is blocked (step 55). IF the decision is affirmative at step 54 controller 12 searches the routing table and selects an alternative path to the destination, and exits to step 56 to determine whether the new path includes any of the links at which this connection has been blocked previously. If so, this path is removed from consideration and control returns to step 54 to repeatedly execute the steps 54 and 56 until a negative decision is made at step 54 or step 56.

Following the negative decision at step 56, controller 12 checks to see if enough resources are available over the next hop to support the requested QOS requirements. If enough resources are not available, control returns to step 54 to repeat the above process.

If enough resources are available, control branches out to step 58 to update the cost threshold and crankback limit (the functions of which will be described in connection with FIG. 5) as required since the path being tried is not the least cost path to the destination. Controller 12 further alters the control flag from combined control to originating control If the network is overly congested, so that processing resources within the network can be saved.

With the new values now set in the connection setup packet, control repeals the steps 47 to 50 by setting all node identifiers of the selected route into the packet, setting the forwarding table, adding the node identifier of the next hop and the link cost to the packet and forwarding the new connection setup packet through the newly determined output port.

Figure 5:
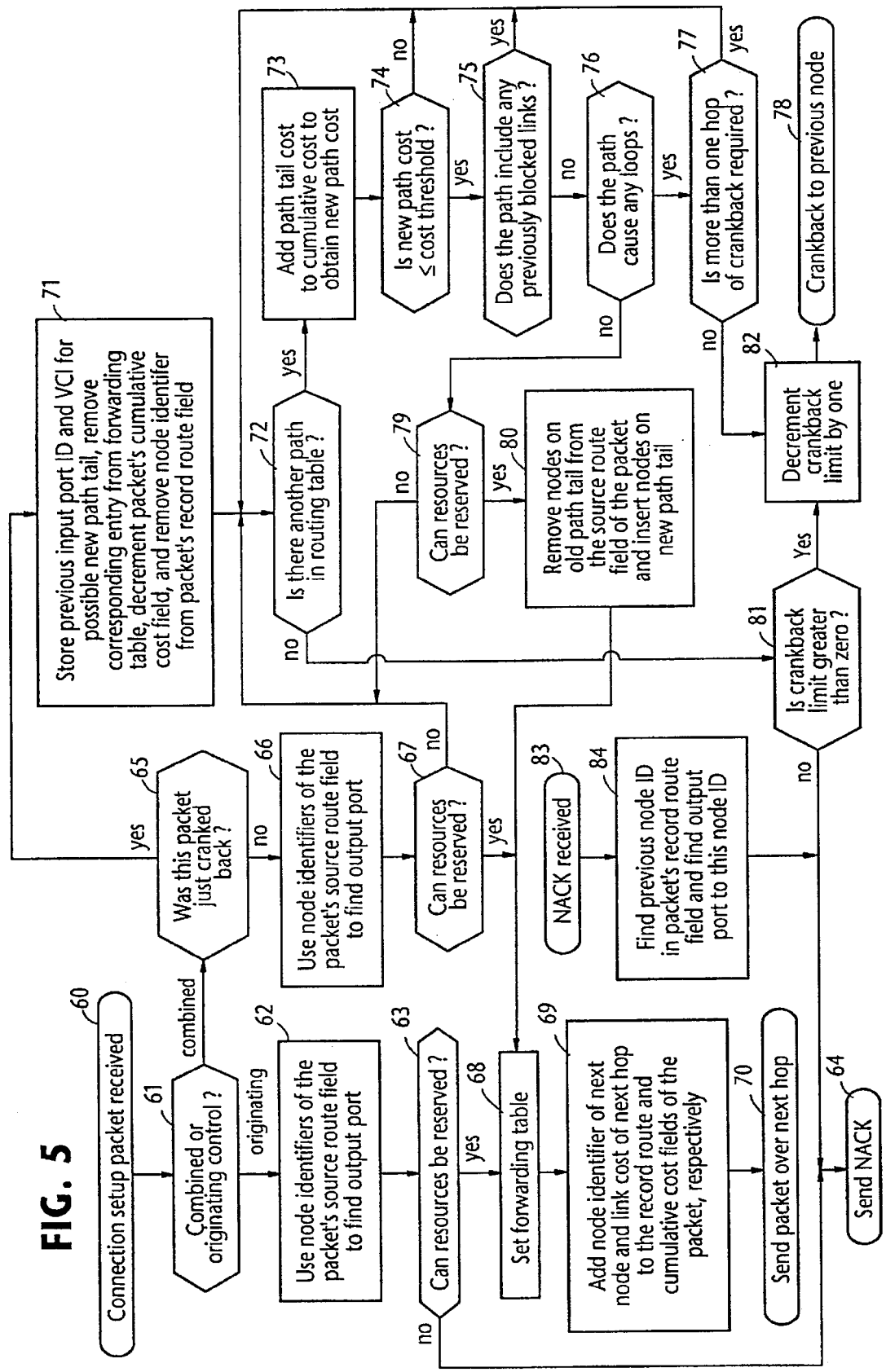
FIG. 5 shows in flow diagram form a sequence of operations performed by the switch controller of FIG. 2 when the node is functioning as an intermediate node.

As illustrated in FIG. 5, when functioning as an intermediate node, the switch controller 12 of each node follows a procedure which begins at step 60 with the receipt of a connection setup packet through an incoming node interface 10. Exit then is to decision step 61 where the controller checks the flag field of the received packet. If the source node has determined to use originating control, then all alternate path decisions must be made at the source node, leaving only a transport function for the intermediate node. In this case, control branches at step 61 to step 62 where the node identifiers of the packet's source route field are used by controller 12 to find an output port. At step 63, the intermediate node determines whether enough resources are available over the next hop to support the requested QOS parameters. If the decision is negative, control advances to step 64 to send a NACK packet to the adjacent upstream node. If the decision is affirmative, then connection setup will proceed using this path in a manner to be described later.

If the source node has determined to use combined control, step 65 is executed by checking whether or not the received packet was just cranked back. If not, control proceeds to step 66 to use the node identifiers of the packet's source route field to find an output port in the same manner as in step 62. Similar to step 623, step 67 is executed following step 66 to check for the availability of enough resources that satisfy the requested QOS parameters.

If the decision at step 63 or 67 is affirmative, control exits to step 68 to set the forwarding table of the incoming node interface 10 by storing the VCI contained in the received packet into the incoming VCI field of an entry of the forwarding table, and storing an output port determined from the source route field of the packet into and a selected outgoing VCI into the forwarding table entry. At step 69, the switch controller inserts the node identifier of the next node into the record route field 34 of a packet regardless of the control flag of the received packet, and accesses the node memory 17 to read the cost of the link to the next node if the combined control flag is indicated and insert the link cost to the cumulative cost field 35 of the packet. At step 70, the switch controller forwards the packet to the next node through the selected output port.

If the decision is affirmative at step 65 or negative at step 67, an attempt will then be made to find a new path tail (a path section from the intermediate node of interest to the destination). As described hereinbelow, if no new path tail is available, the connection setup packet will be cranked back to an adjacent upstream node or a NACK packet will be returned to the source node if the adjacent upstream node is the source node. Specifically, at step 65 the affirmative decision causes control to branch out to step 71 to store the previous input port IP/ID and VCI for a possible new path tall, remove the forwarding table entry corresponding to the previous input port from the forwarding table, decrement the value of the cumulative cost field of the cranked back packet by an amount corresponding to the cost of the blocked link, and remove the node identifier from the packet's record route field.

Exit then is to step 72 to determine whether there is another path available in the routing table of the node of interest which has not been tested before. If the decision at step 72 is affirmative, control proceeds to step 73 to add the cost of the new path tail to the destination to the value of the cumulative cost field of the packet to obtain a new path cost. At step 74, the new path cost is compared to the cost threshold to determine whether it is equal to or less than the cost threshold. If the decision is negative, control returns to step 72 to repeat the path finding process. If affirmative, control proceeds to step 75 to check to see if the new path includes any of the previously blocked links saved in the node memory for this connection. If so, this path must be removed from consideration as it is likely that the connection will be blocked at the same link again. Therefore, control returns to step 72 to repeat the new path finding procedure.

If the new path includes no previously blocked links, a further check is made at step 76 on the new path to determine whether the new path causes any loops or requires crankback. Specifically switch controller 12 checks to see if the new path includes any of the nodes set in the record route field of the connection setup packet. If so, the use of the new path tail would cause a loop. In order to avoid looping, the path requires crankback to the previous node included in both the record route field of the packet and the new path tail.

If the new path causes a loop, control proceeds to step 77 to determine whether the new path requires more-than-one crankbacks. Since it takes long to perform crankback more than one hop, connections requiring more-than-one crankbacks are removed from consideration, and in this case, an affirmative decision is made at step 77 and control returns to step 72 to find a different path. If the new path requires only one hop of crankback, a negative decision is made at step 77 and control moves ahead to step 82 where the crankback limit is decremented by one and step 78 is then executed to crank back the connection setup packet to the previous node.

If the new path does not cause any loops (step 76), control branches out to decision step 79 to perform call admission control on the new path. If enough resources are not available, control returns to step 72 to find a new path. If available, control proceeds to step 80 to remove the node identifiers of the old path tail from the source route field of the connection setup packet and insert the node identifiers of the new path tail. Following the updating of the source route fiord of the packet, control returns to step 68 to set the forwarding table in order to send the updated packet.

Returning to the path finding step 72, if no path is available, control branches out to decision step 81 to determine whether the crankback limit value of the packet is greater than zero. If the connection setup packet has been cranked back less than the number of times originally specified by the source node, an affirmative decision is made at step 81 and control proceeds to step 82 where the crankback limit is decremented by one. The output port to be used to return the packet is the output port that leads to the same line interface node through which the packet was received. The VCI used over the previous hop is included in the connection setup packet so that the previous node can locate the corresponding forwarding table entry. Exit then is to step 28 to crank back the packet to the previous node.

If the crankback limit is less than or equal to zero, then the connection setup packet has already been cranked back at least as many times as was originally allowed by the source node. In this case, control branches at step 81 to step 64 to send a NACK packet to the source node. The NACK packet includes a record route field that allows the source node to choose an alternate path that avoids previously blocked links.

For a full understanding of the present invention, the operation of the ATM network will be described with reference to FIGS. 6 and 7 by assuming that a virtual connection is established from node A to node G using a cost threshold $\hat{D}$ given by $\hat{D}=[1.1 \times D_j]$ (where $D_j$ is the cost of the j-th least cost path between the source and the destination) and that a crankback limit 1 is used, and each node maintains two least cost paths to every destination in its routing table. The resulting routing tables for nodes A through D are shown in FIGS. 6A to 6D, respectively.

Source node A initially receives a request packet containing a VCI with value of, say, 129, to establish a virtual connection to the destination node G from a host terminal (step 40) at input port identified as IP/ID=5, for example. A source route involving nodes A, B, D, E and G (in the order named) is found to be the least cost path in the routing table at node A (step 41) since the total cumulative cost ($=D_1$) of this route is 5 which compares favorably with the total cumulative cost ($=D_2$) 6 of the route involving nodes A, C and G. Source node A determines that routing of this connection should proceed using combined control (step 42). Therefore, the cost threshold $\hat{D}_G$ is determined to be equal to [6.6]=7 and a crankback limit is set to 1 (step 44). Source node A sets the combined/originating control flag to indicate that combined control routing is being used (step 45). Source node A then invokes call admission control for the first hop by executing step 46, which results in a decision that the first hop, from node A to node B, has enough resources available to support the requested QOS parameters. The source route A-B-D-E-G determined at step 41 as a least cost route is inserted into the source route field 33 of the connection setup packet (step 47). An output port of ID=1, for example, and an outgoing VCI of value, say, 171, are chosen and a set of values VCI(i)=129, OP/ID=1 and VCI(o)=171 is set into an entry of the routing table for the incoming host interface 10 (step 48). Source node A sets node ID=A into the record route field 34 of the packet and a value of 1, which is the link cost between nodes A and B, into the cumulative cost field 35 of the packet (step 49), and transmits the packet to node B (step 50).

On receiving the connection setup packet through an incoming node interface with input port identified as IP/ID=1 (step 60), the switch controller 12 at intermediate node B reads the contents of the packet and determines that combined control is being used (step 61) and that the packet is not being cranked back (step 65). By using the source route A-B-D-E-G set in the packet, node B determines that the next hop is to node D through an output port with ID=3, for example (step 66). Node B performs call admission control and determines that enough resources are available for the next hop to node D (step 67) and then sets the forwarding table of the incoming node interface by choosing an outgoing VCI of value, say, 152, and inserting a set of values VCI(i)=171, OP/ID=3 and VCI(o)=152 into that table (step 68). Next, the cumulative cost field of the connection setup packet is increased to 2 by an increment of 1, which is the link cost between nodes B and D, and the node B is added to the record route field of the packet, resulting in a record route A-B (step 69). The connection setup packet is now forwarded from node B to node D through output port ID=3.

Figure 7A:
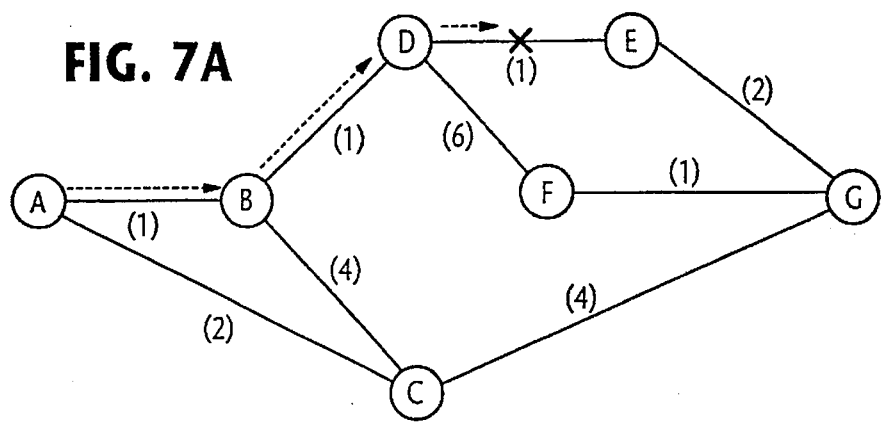
FIGS. 7A to 7D show the operation of the network under assumed conditions using broken-line arrows indicating the direction of connection setup packets propagating through the network.

On receiving the connection setup packet through an incoming node interface with the input port IP/ID=1 (step 60), the switch controller 12 at intermediate node D reads the contents of the packet and determines that combined control is being used (step 61) and that the packet is one that is being forwarded rather than being cranked back (step 65). By using the source route A-B-D-E-G set in the packet, node D determines that the next hop is to node E through an output port with ID=3, for example (step 66). Node D then performs call admission control (step 67). However, this time the call admission control determines that enough resources are not available for the next hop from node D to node E, and so this connection is blocked as shown in FIG. 7A.

Figure 7B:
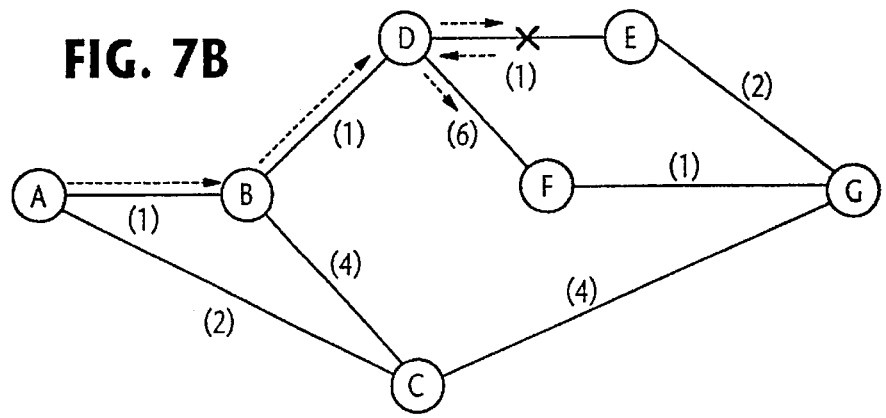

Node D then proceeds to find another path to the destination node G. The routing table at node D lists two paths to the destination (FIG. 6D). Since the first path D-E-G is the blocked path, the second path D-F-G is selected (step 72) to be checked for path cost comparison (FIG. 7B). The second path D-F-G adds a cost of 7 to the current cost with value 2, resulting in a total cumulative cost of 9 (step 73), which exceeds the cost threshold $\hat{D}_G$=7 (step 74). As a result, a test is made again to find another path (step 72). Since no further paths to the destination node G are included in node D's routing table, the result of the test indicates that the connection setup packet must be cranked back. As the crankback limit is still greater than zero (step 81), it is decremented by one to zero (step 82) and the connection setup packet is cranked back through output port ID=1 to node B, the adjacent upstream node listed in the record route field of the packet (step 78) as shown in FIG. 7C.

Upon arriving at node B (step 60) at input port IP/ID=3, the connection setup packet is checked for identify and determined that it is using combined control (step 61) and that it was just cranked back from node D (step 65). By using the outgoing VCI=152 set in the packet, the forwarding table entry containing VCI(i)=171, OP/ID=3, VCI(o)=152 is located for input port IP/ID=1, this input port identifier and VCI=171 are saved in memory for possible new path, and this entry is removed from the forwarding table. The current cost in the cumulative cost field is decremented by one, back to the previously received value of 1, and node B removes its node identifier from the record route field of the packet (step 71).

Figure 7C:
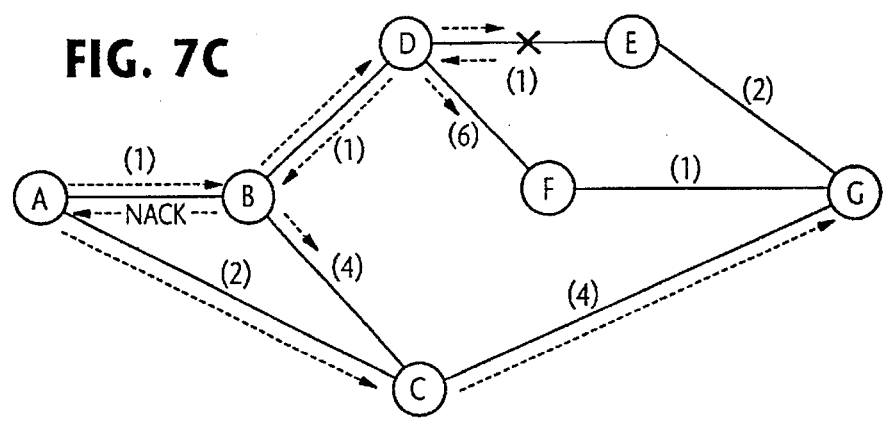

With the crankback-related procedures being completed, node B searches its routing table for another path to the destination node G, i.e., the path from node B to node C (FIG. 7C). The first path listed in node B's routing table is the blocked path and the second path listed therein follows the path B-C-G (step 72). This path adds a cost of 8 to the current cost of 1, resulting in a total cumulative cost of 9 (step 73), which exceeds the cost threshold $\hat{D}_G$=7 (step 74). Since no further paths to the destination node G are included in node B's routing table (step 72), and the crankback limit is equal to zero (step 81), a NACK packet is returned to the source node A (step 64), as shown in FIG. 7C, which contains the saved VCI=171 and the other necessary values updated in a manner just described.

Upon receiving the NACK packet (step 51), node A removes the corresponding forwarding table entry containing VCI(i)=129, OP/ID=1 and VCI(o)=171 for input port IP/ID=5 (step 52). No release packet need be sent since the NACK packet is originated from node B (the record route field of the NACK packet includes the identifier of node A only), which is only one hop away and which has already removed its corresponding forwarding table entry (also step 52). Node A saves the identify of the link to node B (over output port ID=1) as being blocked, as it knows that all paths from node A to node B have been tried already (step 53). Since the first entry in node A's routing table with destination G is the blocked path, the second path A-C-G is tried next (step 54). The second path is totally disjoint from the first path, and so it does not include any of the previously blocked links (step 56). The first hop, from node A to node C, has enough resources available to support the required QOS parameters (step 57). The crankback limit is reset to the initial value of 1, but the cost threshold remains unchanged (step 5B). The path A-C-G is set into the source route field of the connection setup packet (step 47). An outgoing VCI of value, say, 176 is chosen and a new entry VCI(i)=129, OP/ID=2 and VCI(o)=176 is stored in the forwarding table at node A for input port IP/ID=5. Finally, the node A identifier is stored in the record route field of the packet and its cumulative cost field is set equal to 2, which is the link cost between nodes A and C (step 49). The packet is now forwarded from node A to node C (step 50).

The connection setup packet arrives at node C (step 60), where it is checked for identity and determined that it is using combined control (step 42) and being forwarded to it (step 65). The source route field of the packet is checked to see if the next hop is to node G (step 66). The next hop, from node C to node G, has enough resources available again (step 67). An outgoing VCI=134 is then chosen and the forwarding table for Input port IP/ID=1 is updated with the entry VCI(i)=176, OP/ID=3 and VCI(o)=134 and the node C is added to the record route field of the packet and the cumulative cost field of the packet is increased to 6 (step 69). The packet is then forwarded to the destination node G through the output port ID=3 (step 50) and received by node G as shown in FIG. 7C.

Figure 7D:
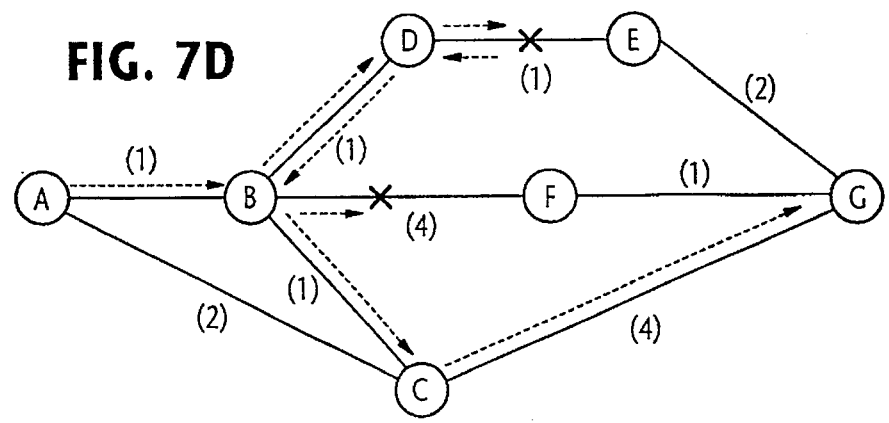

With a connection being established in this way between nodes A and G, data cells associated with this connection follows the same path in the usual manner in which the header controller of each node in the path looks up the forwarding table to rewrite their cell header. If the cost of the link between nodes B and C is 1, instead of 4, and a link with a cost of 4 is provided between nodes B and F, instead of the link between nodes D and F, as illustrated in FIG. 7D, and the routing tables of nodes A, B and D become as shown in FIGS. 6E, 6F and 6G, respectively. Node B responds to the connection setup packet cranked back from node D by finding a new path tail from the node B' routing table. The second candidate path B-F-G will then be tested. Since this path tail has a lower cost than the cost threshold, contains no previously blocked links and causes no loops (steps 74, 75 and 76), it is subjected to resource availability test (step 79). If enough resources are not available over the next hop from node B to node F, the third candidate path B-C-G is selected (step 72), which adds a cost of 5 to the current cost 1 (step 73), which is less than the threshold (step 74). Since this path tail contains no previously blocked links and causes no loops (steps 75 and 76), resource availability test is made (step 79). If enough resources are available, the node identifiers of nodes D and E are removed from the source route field 33 of the connection setup packet and the node C identifier is inserted therefor (step 80). The packet is then forwarded to node C after executing steps 68, 69 and 70.

Upon receiving the packet from node B, node C identifies it as a combined control routing packet being forwarded to it, not as a crankback packet, and finds an output port using the node identifiers of the packet's source route field (step 66). If enough resources are available over the next hop to the destination to support the requested QOS parameters (step 67), the packet is forwarded from node C to node G (see FIG. 7D).

If originating control is used at source node A, the connection setup packet is forwarded through node B to node D where the connection request is rejected due to the lack of resources that satisfy the QOS requirements (step 63) and node D returns a NACK packet (step 84) to node B. When the NACK packet is received (step 83, FIG. 5), node B executes step 84 by finding the previous node identifier in packet's record route field and find the corresponding output port to this node identifier and sends the NACK packet, to source node A (step 64). On receiving the NACK packet (step 51), source node A executes steps that follow step 51 to find a new path using its routing table. In the case of originating control, no attempt is made at any intermediate nodes for finding a path whenever the VC connection request is rejected. Although not shown in FIG. 3, every packet additionally includes the VCI and input port ID of the source node so that the NACK packet allows the source node to find the corresponding entry in the forwarding table.

The foregoing description shows only one preferred embodiment of the present invention. Various modifications are apparent to those skilled in the art without departing from the scope of the present invention which is only limited by the appended claims. Therefore, the embodiment shown and described is only illustrative, not restrictive,

What is claimed is:

1. In a connection-oriented communications network including a plurality of network nodes interconnected by links, each of said network nodes functioning as a source node, an intermediate node or a destination node, a method comprising the steps of:

a) selecting, at a source node, a route therefrom to a destination node and establishing a connection from the source node to an intermediate node on the route;

b) extending the connection from the intermediate node along the route if there is an acceptable link in the selected route;

c) selecting, at said intermediate node, a first route section including one or more intermediate nodes therefrom to said destination node if there is no acceptable link in the route selected by the step (a);

d) determining, at said intermediate node, whether a total cost of links from said source node to said destination node via said first route section is more or less than a cost threshold and extending said connection from the intermediate node along said first route section if said total cost is less than the cost threshold and there is an acceptable link in the first route section;

e) cranking the connection from the intermediate node back to an adjacent upstream node if said total cost is more than the cost threshold and there is no acceptable link in the first route section;

f) selecting, at said upstream node, a second route section including one or more intermediate nodes therefrom to said destination node and determining whether a total cost of links from said source node to said destination node via the second route section is more or less than said cost threshold;

g) extending the connection from the upstream node along the second route section if the total cost of the step (f) is less than the cost threshold and there is an acceptable link in the second route section; and h) clearing the connection if the total cost of the step (f) is more than the cost threshold or there is no acceptable link in the second route section and repeating the steps (a) to (g).

2. In a connection-oriented communications network including a plurality of network nodes interconnected by links, each of said network nodes functioning as a source node, an intermediate node or a destination node, a method comprising the steps of:

a) selecting, at a source node, one of first and second flags respectively representing different routing modes and a first route from the source node to a destination node in response to a connection request and establishing a connection from the source node to a first intermediate node located along the first route;

b) responsive to the first flag, extending the connection from the first intermediate node along the first route if there is an acceptable link in said first route far the first intermediate node to use, selecting a first route section from the first intermediate node to the destination node if there is no acceptable link in said first route and extending the connection from the first intermediate node along the first route section if a total cost of links from said source node to said destination node using said first route section is less than a cost threshold, and cranking the connection back to an upstream node if there is none of said first route sections;

c) selecting, at the upstream node, a second route section if a total cost of links from the source node to the destination node using the second route section is less than the cost threshold and extending the connection from said upstream node to a second intermediate node along the second route section, and clearing the connection if there is none of said second route sections;

c) selecting, at the source node, the other flag and a second route from the source node to the destination node, and establishing a connection from the source node to a third intermediate node along the second route; and d) responsive to the second flag, extending the connection from the third intermediate node along the second route if there is an acceptable link from the third intermediate node toward the destination node, and clearing the connection if there is no acceptable link therefrom toward the destination node.

3. A connection-oriented communications network having a plurality of network nodes interconnected by links, each of the nodes functioning as a source node or an intermediate node, the source node comprising:
   a routing table for mapping a plurality of routes from the source node to other network nodes; and
   means for searching the routing table of the source node and selecting a first candidate route to a destination node in response to receipt of a request for a connection and selecting a second candidate route in response to a negative acknowledgment (NACK) packet from an adjacent node, setting a list of node identities of one of the first and second candidate routes, a cost threshold and a cost of the link from the source node to an intermediate node of one of said routes into a packet, and transmitting the packet from the source node to the intermediate node as a connection setup packet;

said intermediate node comprising:
   a routing table for mapping a plurality of routes from the intermediate node to other network nodes;

means for receiving a said connection setup packet from an adjacent node located upstream of the intermediate node;

means for adding a cost of the link from the intermediate node to an adjacent intermediate node which is identified by the list of the received packet to the cost set in the received packet if the link between the intermediate node to said adjacent intermediate node has enough resources to support a required value, and transmitting the packet to said adjacent intermediate node as a new connection setup packet;

means for searching the routing table of the intermediate node and selecting a route section from the intermediate node to the destination node not included in the list of node identities of the received packet if the route indicated by the list of the received packet has not. enough resources for the link between the intermediate node and the adjacent intermediate node, the selected route section having enough resources to support the required value for the link between the intermediate node and an adjacent intermediate node of the route section, a total of the cost set in the received packet and the cost of the route section being less than the cost threshold set in the received packet;

means for replacing one or more node identities of the list of the received packet with one or more node identities of the route section, adding a cost of the link between the intermediate node and the adjacent intermediate node of the route section to the cost set in the received packet, and transmitting the packet to said adjacent intermediate node of the route section as a new connection setup packet;

means for returning a NACK packet to said adjacent upstream node if there is no acceptable route in the routing table of the intermediate node to reach said destination node; and means for relaying a NACK packet when same is received from an adjacent downstream node to said adjacent upstream node.

4. A connection-oriented communications network as claimed in claim 3, wherein the NACK packet includes a second list of node identities identifying the nodes through which the connection setup packet has traveled so that the source node identifies previously blocked links for selecting said second candidate route.

5. A connection-oriented communications network having a plurality of network nodes interconnected by links, each of the nodes functioning as a source node or an intermediate node, the source node comprising:

a routing table for mapping a plurality of routes from the source node to other network nodes; and means for searching the routing table of the source node and selecting a first candidate route to a destination node in response to receipt of a request for a connection and selecting a second candidate route in response to a negative acknowledgment (NACK) packet from an adjacent node, setting a list of node identities of one of the first and second candidate routes, a cost threshold, a crankback limit and a cost of the link from the source node to an intermediate node of one of said routes into a packet, and transmitting the packet from the source node to the intermediate node as a connection setup packet;

said intermediate node comprising:

a routing table for mapping a plurality of routes from the intermediate node to other network nodes;

means for receiving a said connection setup packet from an adjacent node located upstream of the intermediate node;

means for adding a cost of the link from the intermediate node to an adjacent intermediate node which is identified by the list of the received packet to the cost set in the received packet if the link between the intermediate node to said adjacent intermediate node has enough resources to support a required value, and transmitting the packet to said adjacent intermediate node as a new connection setup packet;

means for searching the routing table of the intermediate node and selecting a route section from the intermediate node to the destination node not included in the list of node identities of the received packet if the route indicated by the list of the received packet has not enough resources for the link between the intermediate node and the adjacent intermediate node, the selected route section having enough resources to support the required value for the link between the intermediate node and an adjacent intermediate node of the route section, a total of the cost set in the received packet and the cost of the route section being less than the cost threshold set in the received packet;

means for replacing one or more node identities of the list of the received packet with one or more node identities of the route section, adding a cost of the link between the intermediate node and the adjacent intermediate node of the route section to the cost set in the received packet, and transmitting the packet to said adjacent intermediate node of the route section as a new connection setup packet;

means for decrementing the crankback limit set in the received packet by one and returning the received packet to said adjacent, upstream node if there is no acceptable route in the routing table of the intermediate node to reach said destination node and the crankback limit is greater than zero, or transmitting a NACK packet upstream from said intermediate node to said adjacent upstream node if there is no acceptable route in the routing table of the intermediate node to reach said destination node and the crankback limit is not greater than zero; and means for relaying a said NACK packet when same is received from an adjacent downstream node to said adjacent upstream node.

6. A connection-oriented communications network as claimed in claim 5, wherein the NACK packet includes a second list of node identities identifying the nodes through which the connection setup packet has traveled so that the source node identifies previously blocked links for selecting said second candidate route.

7. A connection-oriented communications network having a plurality of network nodes interconnected by links, each of the nodes functioning as a source node or an intermediate node, the source node comprising:

a routing table for mapping a plurality of routes from the source node to other network nodes; and means for searching the routing table of the source node and selecting a first candidate route to a destination node and one of first and second routing modes in response to receipt of a request for a connection, selecting a second candidate route and the other routing mode in response to receipt of a negative acknowledgment (NACK) packet from an adjacent node, setting a list of node identities of one of the first and second candidate routes and a flag indicating the selected routing mode into a packet, additionally setting a cost threshold and a cost of the link from the source node to an intermediate node of one of said candidate routes into said packet if said first routing mode is selected, and transmitting the packet from the source node to the intermediate node as a connection setup packet;

said intermediate node comprising:

a routing table for mapping a plurality of routes from the intermediate node to other network nodes;

means for receiving a said connection setup packet from an adjacent node located upstream of the intermediate node;

means, responsive to the flag of the received packet indicative of the first routing mode, for adding a cost of the link from the intermediate node to an adjacent intermediate node which is identified by the list of the received packet to the cost set in the received packet if the link between the intermediate node and sold adjacent intermediate node has enough resources to support a required value, and transmitting the packet to said adjacent intermediate node as a new connection setup packet;

means, responsive to the flag of the received packet indicative of the first routing mode, for searching the routing table of the intermediate node and selecting a route section from the intermediate node to the destination node not included in the list of node identities of the received packet if the link between the intermediate node and the adjacent intermediate node has not enough resources to support said required value, the selected route section having enough resources to support the required value for the Link between the intermediate node and an adjacent intermediate node of the route section, a total of the cost set in the received packet and the cost of the route section being less than the cost threshold set in the received packet;

means, responsive to the flag of the received packet indicative of the second routing mode, for transmitting a copy of the received packet to said adjacent intermediate node if the link between the intermediate node and said adjacent intermediate node has enough resources to support said required value or returning a NACK packet to sold adjacent upstream node if the link between the intermediate node and said adjacent intermediate node has not enough resources to support said required value;

means, responsive to the flag of the received packet indicative of the first routing mode, for returning a NACK packet to said adjacent upstream node if there is no acceptable route in the routing table of the intermediate node to reach said destination node;

means, responsive to the flag of the received packet indicative of the first routing mode, for replacing one or more node identities of the list of the received packet with one or more node identities of the route section, adding a cost of the link between the intermediate node and the adjacent intermediate node of the route section to the cost set in the received packet, and transmitting the packet to said adjacent intermediate node of the route section as a new connection setup packet; and means for relaying a NACK packet when same is received from an adjacent downstream node to said adjacent upstream node.

8. A connection-oriented communications network as claimed in claim 7, wherein the NACK packet includes a second list of node identities identifying the nodes through which the connection setup packet has traveled so that the source node identifies previously blocked links for selecting said second candidate route.

9. A connection-oriented communications network having a plurality of network nodes interconnected by links, each of the nodes functioning as a source node or an intermediate node, the source node comprising:

a routing table for mapping a plurality of routes from the source node to other network nodes;

means for searching the routing table of the source node and selecting a first candidate route to a destination node and one of first and second routing modes in response to receipt of a request for a connection, selecting a second candidate route and the other routing mode in response to receipt of a negative acknowledgment (NACK) packet from an adjacent node, setting a list of node identities of one of the first and second candidate routes and a flag indicating the selected routing mode into a packet, additionally setting a cost threshold, a crankback limit and a cost of the link from the source node to an intermediate node of one of said candidate routes into said packet if said first routing mode is selected, and transmitting the packet from the source node to the intermediate node as a connection setup packet;

said intermediate node comprising:

a routing table for mapping a plurality of routes from the intermediate node to other network nodes;

means for receiving a said connection setup packet from an adjacent node located upstream of the intermediate node;

means, responsive to the flag of the received packet indicative of the first routing mode, for adding a cost of the link from the intermediate node to an adjacent intermediate node which is identified by the list of the received packet to the cost set in the received packet if the link between the intermediate node and said adjacent intermediate node has enough resources to support a required value, and transmitting the packet to said adjacent intermediate node as a new connection setup packet;

means, responsive to the flag of the received packet indicative of the first routing mode, for searching the routing table of the intermediate node and selecting a route section from the intermediate node to the destination node not included in the list of node identities of the received packet if the link between the intermediate node and the adjacent intermediate node has not enough resources to support said required value, the selected route section having enough resources to support the required value for the link between the intermediate node and an adjacent intermediate node of the route section, a total of the cost set in the received packet and the cost of the route section being less than the cost threshold set in the received packet;

means, responsive to the flag of the received packet indicative of the first routing mode, for replacing one or more node identities of the list of the received packet with one or more node identities of the route section, adding a cost of the link between the intermediate node and the adjacent intermediate node of the route section to the cost set in the received packet, and transmitting the packet to said adjacent intermediate node of the route section as a new connection setup packet;

means, responsive to the flag of the received packet indicative of the first routing mode and the crankback limit thereof being greater than zero, for decrementing the crankback limit by one and returning the received packet to said adjacent upstream node if there is no acceptable route in the routing table of the intermediate node to reach said destination node, or responsive to the flag of the received packet indicative of the first routing mode and the crankback limit thereof being not greater than zero, for transmitting a NACK packet to said adjacent upstream node if there is no acceptable route in the routing table of the intermediate node to reach said destination node;

means, responsive to the flag of the received packet indicative of the second routing mode, for transmitting a copy of the received packet to said adjacent intermediate node if the link between the intermediate node and said adjacent intermediate node has enough resources to support said required value, or returning a NACK packet to said adjacent upstream node if the link between the intermediate made and said adjacent intermediate node has not enough resources to support said required value;

means for relaying a said NACK packet when same is received from an adjacent downstream node to said adjacent upstream node.

10. A connection-oriented communications network as claimed in claim 9, wherein the NACK packet includes a second list of node identities identifying the nodes through which the connection setup packet has traveled so that the source node identifies previously blocked links for selecting said second candidate route.

* * * * *